(12) United States Patent
Sadwick et al.

(10) Patent No.: US 8,238,127 B1
(45) Date of Patent: *Aug. 7, 2012

(54) METHOD AND APPARATUS FOR SUPPLYING AND SWITCHING POWER

(76) Inventors: Laurence P. Sadwick, Salt Lake City, UT (US); Mohammad M. Mojarradi, La Canada, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 12/641,310

(22) Filed: Dec. 17, 2009

Related U.S. Application Data

(63) Continuation-in-part of application No. 11/932,364, filed on Oct. 31, 2007, now Pat. No. 7,656,692.

(51) Int. Cl.
*H02M 7/06* (2006.01)
*H02M 7/217* (2006.01)

(52) U.S. Cl. ............... 363/89; 363/81; 363/126

(58) Field of Classification Search .......... 363/44, 363/52, 53, 81, 84, 89, 125, 126; 323/902
See application file for complete search history.

(56) References Cited

U.S. PATENT DOCUMENTS

| | | | | |
|---|---|---|---|---|
| 5,004,972 A | * | 4/1991 | Roth | 323/320 |
| 5,175,487 A | * | 12/1992 | Inoue | 323/303 |
| 5,287,263 A | * | 2/1994 | Shilo | 363/143 |
| 6,428,694 B1 | * | 8/2002 | Brown | 210/170.07 |
| 7,088,964 B2 | * | 8/2006 | O | 455/90.3 |
| 7,092,268 B2 | * | 8/2006 | George | 363/126 |
| 7,102,902 B1 | * | 9/2006 | Brown et al. | 363/89 |
| 7,656,692 B2 | * | 2/2010 | Sadwick et al. | 363/89 |
| 7,924,174 B1 | * | 4/2011 | Gananathan | 340/999 |
| 2005/0116662 A1 | | 6/2005 | Sanchez | |

* cited by examiner

*Primary Examiner* — Gary L Laxton
(74) *Attorney, Agent, or Firm* — Hamilton, DeSanctis & Cha

(57) ABSTRACT

A dimming power supply includes a power source, a full bridge rectifier with four nodes, a control switch and a controller. The first node is connected to the power source, the second is connected to a load output, and the third is connected to a reference voltage node. The control switch is connected between the fourth node and the reference voltage node. The controller is connected to a control input of the control switch. The controller is adapted to adjust a voltage or current through the load output.

20 Claims, 15 Drawing Sheets

METHOD AND APPARATUS FOR SUPPLYING AND SWITCHING POWER

CROSS REFERENCE TO RELATED APPLICATION

The present application claims priority to U.S. patent application Ser. No. 11/932,364 entitled "Method and Apparatus for Supplying and Switching Power", and filed on Oct. 31, 2007. The aforementioned application is assigned to an entity common hereto, and the entirety of the aforementioned application is incorporated herein by reference for all purposes.

BACKGROUND

High voltage power supplies are needed for many types of electronic devices. A low voltage may be converted to the appropriate high voltage by a transformer and associated signal conditioning components to obtain the desired voltage and current level. Often multiple electronic components and systems are powered by a single power supply. However, some types of loads may need individual current control. Typical power supplies provide global voltage or current control, but not individual voltage or current control for each of a number of outputs. A common solution is to provide a separate regulated power supply for each load or a subset of loads but not the entire set of loads, increasing the size and cost by including a transformer and filtering and control circuitry for each load or subset of loads.

An exemplary prior art power supply is illustrated in FIG. 1, in which a transformer 2 and full bridge rectifier 4 are used to convert an alternating current (AC) input 6 to a full-wave rectified current to power a load 8. The full bridge rectifier 4 comprises four diodes, with two input nodes at anode-cathode junctions between diodes. The full bridge rectifier 4 also comprises two output nodes, one at a cathode-cathode junction between diodes to which the load 8 is connected, and one at an anode-anode junction that is typically grounded. As is known, a direct current (DC) signal may also be provided to the load 8 by connecting a capacitor (not shown) between the output at the cathode-cathode junction of the full-bridge rectifier 4 and ground, thereby smoothing the full-wave rectified current to DC.

SUMMARY

An exemplary embodiment of an apparatus for supplying and switching power may include a power source, a transformer, a full bridge rectifier and a control switch. The transformer has a first winding and a second winding, the first winding being connected to the power source, the second winding having a first tap and a second tap, with the first tap being connected to a first load output. The full bridge rectifier includes four nodes, the first being connected to the second tap of the second winding, the second being connected to a second load output, the third being connected to a reference voltage source. The control switch is connected between a fourth of the four nodes and the reference voltage source.

DESCRIPTION

The drawings and description, in general, disclose a method and apparatus of supplying and switching power to one or more loads. The current through the loads may be individually controlled using relatively low voltage pulse width modulated control signals. Multiple loads may be powered and individually controlled and/or switched from a single power source and by one or more transformers and full bridge rectifiers.

Figure 1:
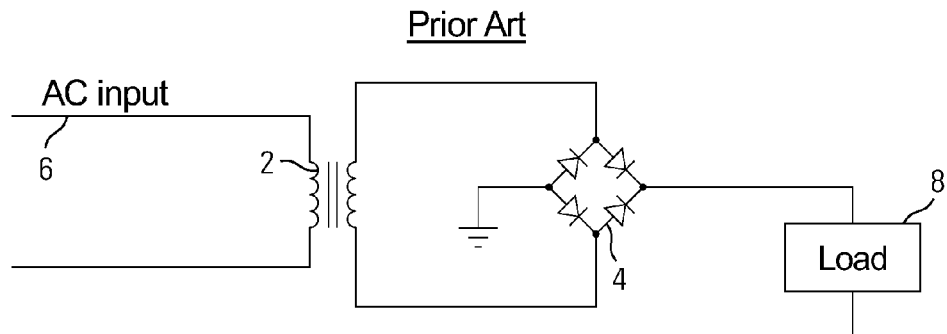
FIG. 1 is a schematic of a prior art power supply.
Figure 2:
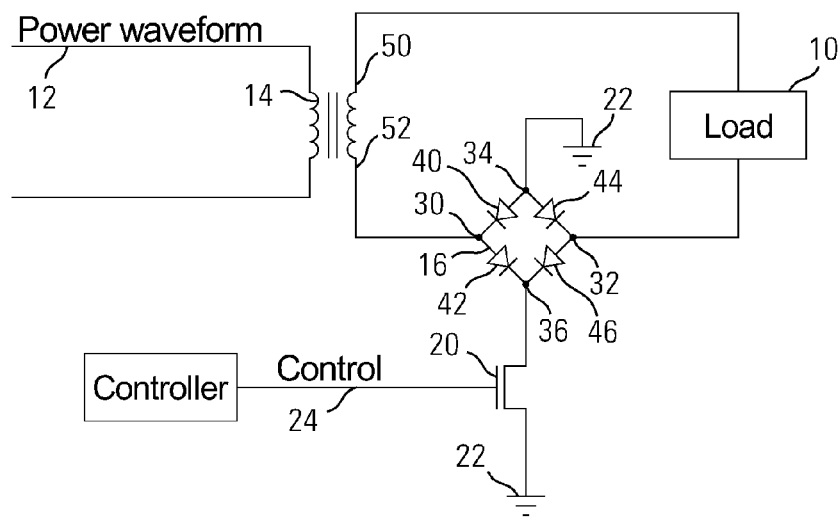
FIG. 2 is a schematic of an exemplary apparatus for supplying and switching power.

Referring now to FIG. 2, an exemplary embodiment of an apparatus for supplying and switching power to a load 10 will be described. In this exemplary embodiment, a power source (not shown) provides a waveform 12 to the primary winding of a transformer 14. A full bridge rectifier 16 made up of four diodes is connected to one tap of the secondary winding of the transformer 14. (Please note that the use of the phrase "full bridge rectifier" herein does not imply any traditional connection of the inputs and outputs of the diode network.) The load 10 is connected to the full bridge rectifier 16 and to another tap of the secondary winding of the transformer 14. In this exemplary embodiment, the portion of the circuit including the transformer 14 and full bridge rectifier 16 has inductance and capacitance values having an LC time constant such that a square wave on the primary winding of the transformer 14 substantially produces a sine wave across the load 10; in certain instances, additional capacitance and capacitors may be included in the circuit. Because the direction of the current through the secondary winding of the transformer 14 and the load 10 alternates, it does not matter whether the load is connected to the upper or lower tap of the secondary winding of the transformer 14 except for the relative phase angle difference depending on how the taps are connected.

A switch 20 such as, for example, an n-channel metal oxide semiconductor field-effect transistor (NMOSFET) or re-channel field effect transistor (FET) or a bipolar transistor or set of transistors is/are connected between the full bridge rectifier 16 and ground 22, with a pulse width modulated (PWM) control signal 24 applied to the control input of the switch 20 to vary the duty cycle of the current through the load 10. It is, of course, understood that any suitable transistor can be used; for example, p-channel MOSFETs (PMOSFETs), bipolar junction transistors, insulated gate bipolar transistors, etc. may be used with or in place of the NMOSFETs.

Figure 3A:
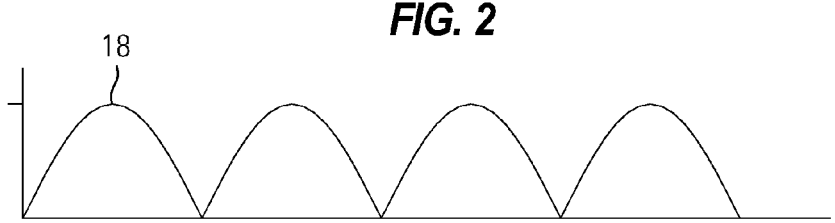
FIG. 3a is an exemplary waveform across a control switch in an exemplary apparatus for supplying and switching power.
Figure 3B:
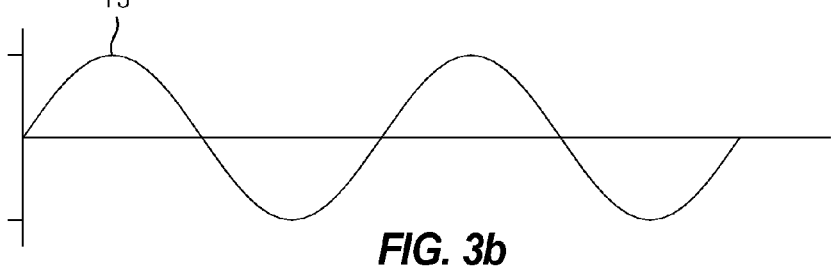
FIG. 3b is an exemplary waveform across a load in an exemplary apparatus for supplying and switching power.

Although the full bridge rectifier 16 generates a rectified sine wave 18 through the switch 20 as illustrated in FIG. 3a, a full sine wave 19 as illustrated in FIG. 3b is produced across the load 10.

The full bridge rectifier 16 has a pair of input nodes 30 and 32 and a pair of output nodes 34 and 36. A first diode 40 is connected in the full bridge rectifier 16 at the anode to output node 34 and at the cathode to input node 30. A second diode 42 is connected at the anode to input node 30 and at the cathode to output node 36. A third diode 44 is connected at the anode to output node 34 and at the cathode to input node 32. A fourth diode 46 is connected at the anode to input node 32 and at the cathode to output node 36. Input node 30 of the full bridge rectifier is connected to one tap of the secondary winding of the transformer 14, input node 32 of the full bridge rectifier is connected to one side of the load 10, and the other side of the load 10 is connected to another tap of the secondary winding of the transformer 14. Output node 34 of the full bridge rectifier 16 is connected to ground 22, and output node 36 of the full bridge rectifier 16 is connected to ground 22 through the control switch 24. Note that the load 10 is connected to a node 32 that is traditionally used as an input to the full bridge rectifier 16 (between an anode and a cathode), and the control switch 20 is connected to a node 36 that is traditionally used as the output of the full bridge rectifier 16 (between two cathodes). This configuration provides simple and effective low voltage control over the current through the load 10, placing the load in what is traditionally the input path of a full bridge rectifier and the control in what is traditionally the output path. This configuration allows an AC signal to be controlled by a DC switch.

Note that the ground 22 may comprise a local ground or an absolute ground, as desired. For the case of a local ground, this may be accomplished by simply connecting node 34 at the anodes of diodes 40 and 44 to the side of the control switch 24 opposite the full bridge rectifier 16.

The transformer 14 used in the apparatus to supply power as described herein is not limited to any particular type of transformer and may change the ratio between the input and output voltage levels in any manner desired. The terms primary and secondary windings are not to be seen as limiting, and are interchangeable. That is, the power source may be connected to either winding of a transformer 14 as desired, with the load 10 and full bridge rectifier 16 connected to the other winding. The voltage or current can be stepped up or stepped down with the transformer, depending, for example, on the particulars of the application.

During operation, the power source generates a square wave across the primary winding of the transformer 14, inducing an alternating current across the secondary winding of the transformer 14. Again, in this exemplary embodiment, the alternating current through the secondary winding is substantially a sine wave (rectified by the full bridge rectifier across the control switch 20), although the current may be shaped to have any other desired waveform by controlling the LC or RC time constants of the circuit or by adding other passive or active components as is known in the art. In addition, a sine wave or any other desired waveform could be used instead of the square wave as an input to the primary side of the transformer. The control switch 20 may be used to turn the current through the load 10 on and off. For the purposes of the following discussion, it will be assumed that the control switch 20 is on, allowing current to flow through the load 10. During one phase of operation, one tap 50 of the secondary winding of the transformer 14 will have a higher potential than the other tap 52, such as a positive voltage at tap 50 and a negative voltage at tap 52. In this phase of operation, current will flow in a loop from ground 22, into the output node 34 of the full bridge rectifier 16, diode 40, input node 30, the secondary winding of the transformer 14, the load 10, input node 32, diode 46, output node 36 and through the control switch 20 to ground 22. During the second phase of operation, tap 52 will be at a higher potential than tap 50, and current will flow in a loop from ground 22, output node 34, diode 44, input node 32, the load 10, the secondary winding of the transformer 14, input node 30, diode 42, output node 36 and through the control switch 20 to ground 22. Thus, at any given time when current is flowing through the load 10, two diodes (e.g., 42 and 44 or 40 and 46) in the full bridge rectifier 16 are conducting a current.

If the control switch 20 is turned off by the input signal, (for example a PWM) control signal 24, the terminating path to ground 22 is disconnected from the load 10 and current cannot flow through the load 10. The control signal 24 may be synchronized with the current waveform through the secondary winding of the transformer 14 or may be asynchronous as desired, either maintaining unbroken waves in the rectified sine wave or chopping them abruptly based on the requirements of the load 10. The frequencies of the current waveform through the secondary winding of the transformer 14 and the PWM control signal 24 may also be set to any desired rates based on the requirements of the load 10. For example, the current waveform through the secondary winding of the transformer 14 may be set at 50 kHz and the PWM control signal 24 may be set at 1 kHz. The width of the pulses on the PWM control signal 24 adjusts the duty cycle of the current through the load 10. If the PWM control signal 24 is on for 900 microseconds and off for 100 microseconds of each period, the duty cycle of the current through the load 10 will be 90%. Note that the PWM control signal 24 of the exemplary embodiment comprises a square wave or series of pulses, but may alternatively comprise any waveform desired to vary the duty cycle of the current through the load 10, or may alternatively comprise a simple on-off control signal to turn the load 10 on or off without varying the duty cycle.

The method and apparatus for supplying and switching power as described herein may be used for either low or high voltage loads as desired, while enabling simple low voltage control. For example, several thousand volts or higher may be provided to the load 10 by selecting diodes in the full bridge rectifier 16 and a control switch 20 that can withstand high voltages without damage. In this case, the control switch 20 may comprise a single high voltage NMOS transistor or other type of transistor, or may comprise a stack of transistors as described in U.S. patent application Ser. No. 11/681,767 entitled "Method and Apparatus for Supplying Power" of Laurence P. Sadwick et al., filed Mar. 3, 2007, which is incorporated herein by reference for all that it discloses. This enables, for example, a PWM control signal 24 of a low voltage, such as 5 volts or 3.3 volts DC, to control a current at a potential of several thousands of volts through the load 10.

Figure 4:
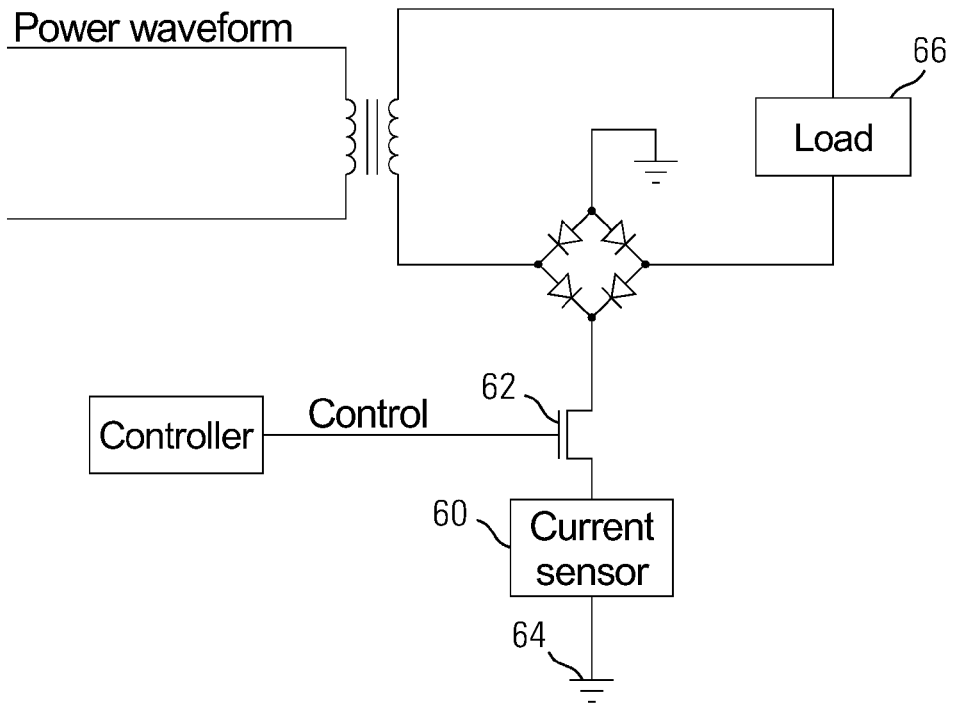
FIG. 4 is a schematic of another exemplary apparatus for supplying and switching power, including a current sensor.
Figure 5:
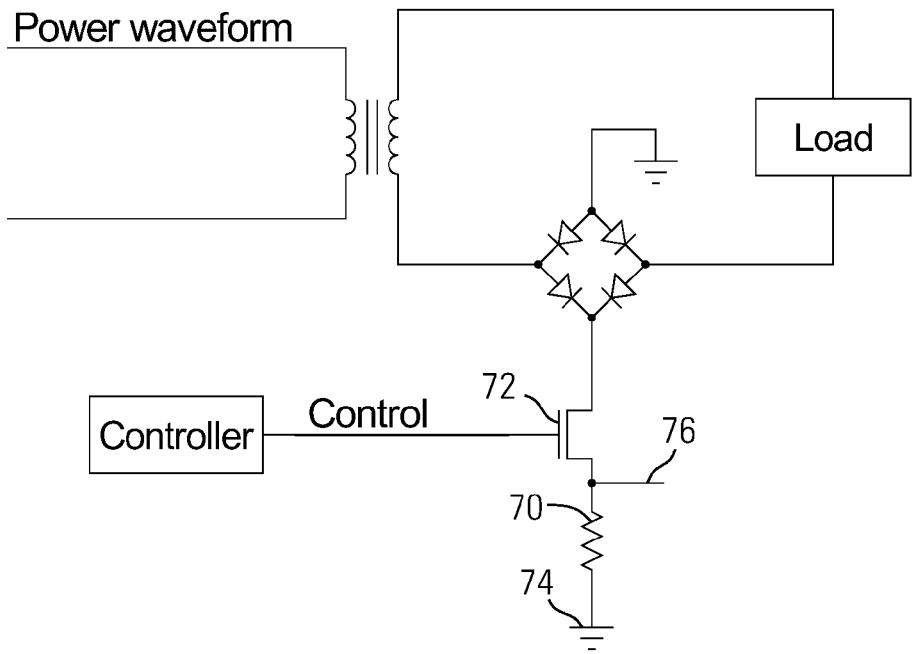
FIG. 5 is a schematic of another exemplary apparatus for supplying and switching power, including a resistor as a current sensor.

Referring now to FIG. 4, another exemplary embodiment of the apparatus for supplying power may include a current sensor 60, placed anywhere desired in the current path such as between the control switch 62 and ground 64. The current sensor 60 may be used to measure the current level through the load 66. The current sensor 60 may comprise any suitable device for detecting and quantifying current, such as a resistor, an inductively coupled coil, an analog to digital (A/D) converter, etc. For example, the current sensor may comprise a resistor 70 as illustrated in FIG. 5, placed between the control switch 72 and ground 74. In this embodiment, the current may be detected and quantified by measuring the voltage drop between a node 76 above the resistor 70 and ground 74, using any suitable device such as an A/D converter, RMS converter, a filter or set of filters, and/or amplifier.

Figure 6:
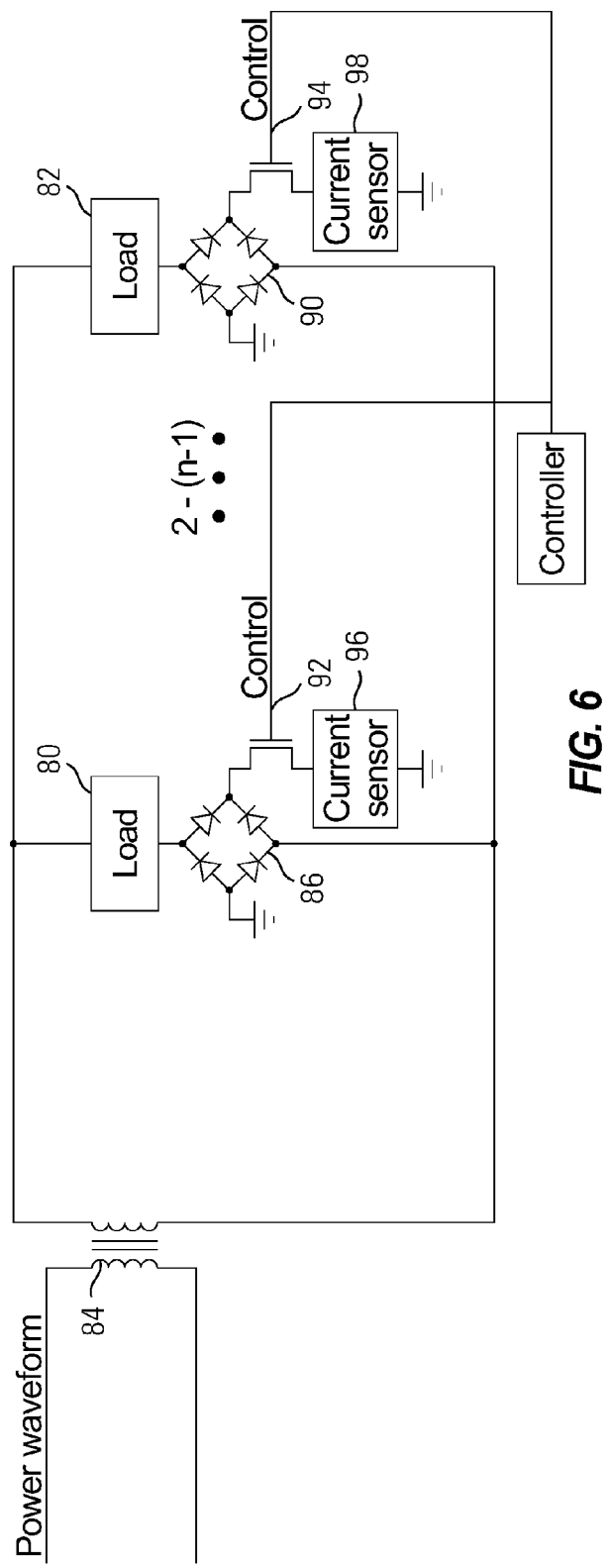
FIG. 6 is a schematic of an exemplary apparatus for supplying and switching power having multiple output stages in parallel, using a single transformer.

Referring now to FIG. 6, multiple loads (e.g., 80 and 82) may be powered by a single transformer 84 and power source (not shown). In this exemplary embodiment, n loads 80 and 82 are connected to one tap of the secondary winding of the transformer 84, and n full bridge rectifiers 86 and 90 are connected to the other tap of the secondary winding of the transformer 84 as described above with respect FIG. 2. Note that it is not necessary that the loads 80 and 82 all be connected to the same tap of the secondary winding of the transformer 84, the load 82 and 84 and full bridge rectifier 86 and 90 may be interchanged if desired, and may also be connected to center taps on the secondary winding of the transformer 84 if desired to provide different maximum voltage levels across the loads 82 and 84. Each load 80 and 82 may be individually controlled by a dedicated control signal 92 and 94, and the current through each load 80 and 82 may be individually monitored by optional dedicated current sensors 96 and 98 if desired.

Figure 7:
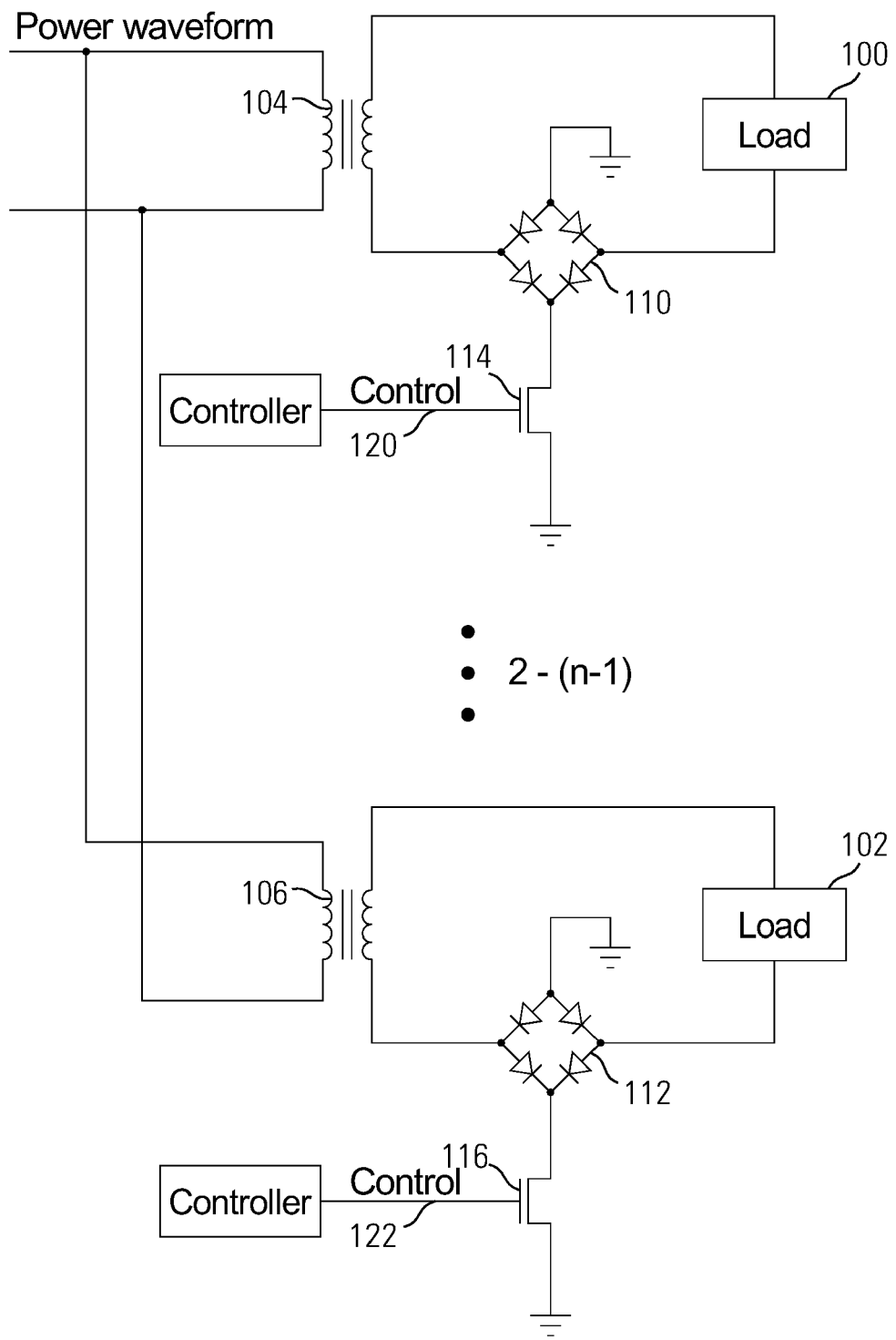
FIG. 7 is a schematic of an exemplary apparatus for supplying and switching power having multiple output stages in parallel, including multiple transformers.

In an alternative embodiment for powering n loads as illustrated in FIG. 7, each load (e.g., 100 and 102) is provided with a dedicated transformer 104 and 106. The transformers 104 and 106 may be identical, or may be individually selected to match the requirements of each load, such as to provide different maximum voltage levels or currents based on the same input waveform from the power source. Each load 100 and 102 is provided with a full bridge rectifier 110 and 112 and may be individually controlled by independent control switches 114 and 116 and PWM control signals 120 and 122. Current through each load may also be individually monitored by including current sensors (not shown) as discussed above.

Figure 8:
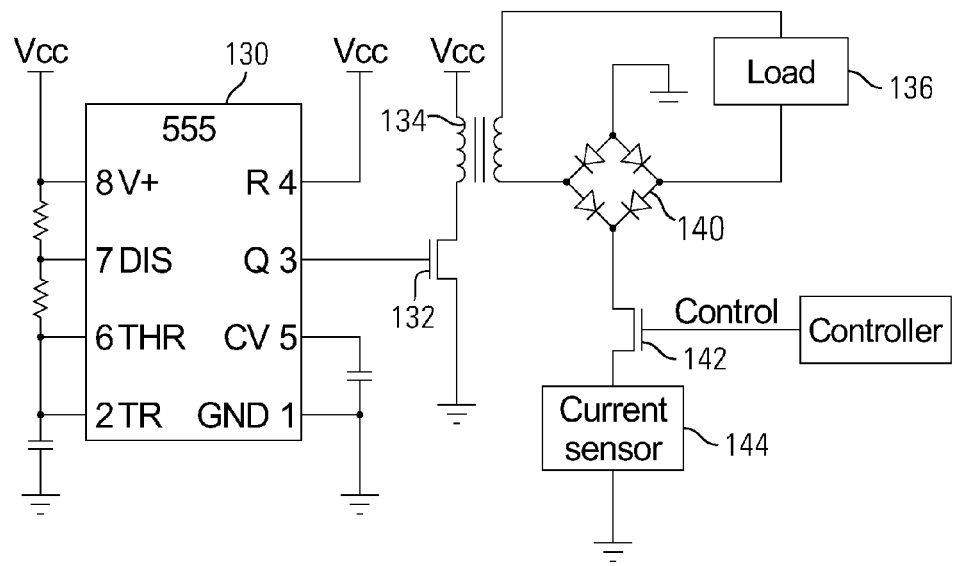
FIG. 8 is a schematic of an exemplary apparatus for supplying and switching power using a 555 timer as an oscillator and a field effect transistor to switch current through a transformer.

Referring now to FIG. 8, an exemplary embodiment of an apparatus for supplying power will be described, including an oscillator for generating a square wave on the primary winding of a transformer. An oscillator such as, for example, a 555 timer 130 or other device is used to generate an alternating waveform such as a square wave or sine wave at any desired frequency. Any suitable oscillator may be used, such as a crystal oscillator, phase locked loop, Wein bridge, Royer, Hartley, or Colpitts oscillator, ring oscillator, logic oscillator, operational amplifier oscillator, bridge oscillator, etc. A switch such as an NMOS transistor 132 applies the waveform generated by the 555 timer 130 to the primary winding of a transformer 134. Filter capacitors (not shown) and other components may be added as desired across the primary and/or secondary winding of the transformer 134 for filtering and resonant tuning to obtain the desired output waveform, but may not be necessary and should be viewed as optional. One or more loads 136, full bridge rectifiers 140, control switches 142 and current sensors 144 may be connected to the secondary winding of the transformer 134 as described above.

Figure 9:
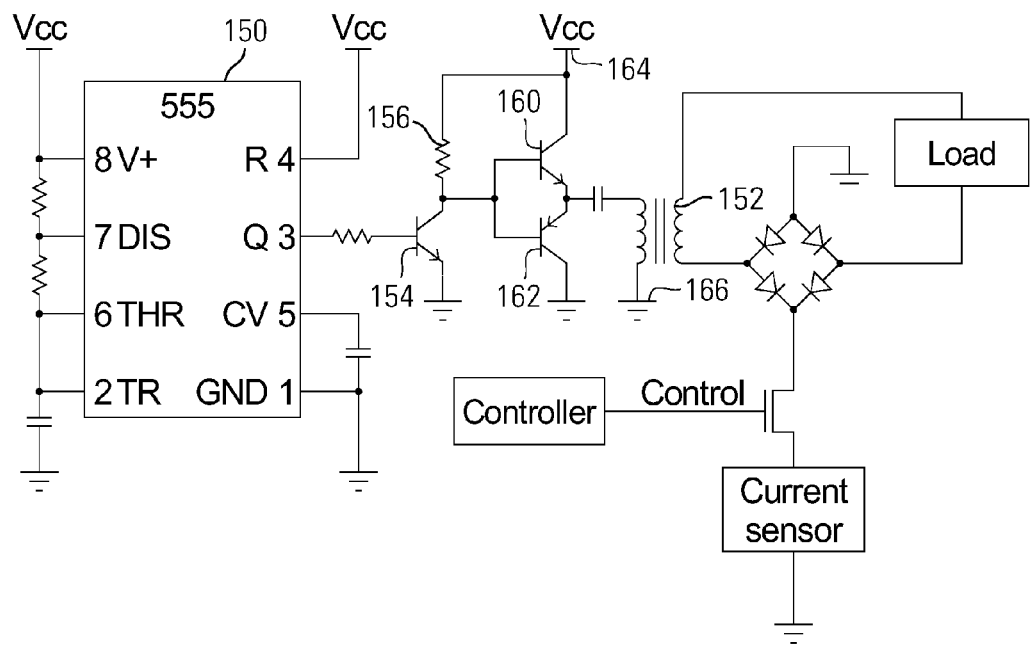
FIG. 9 is a schematic of an exemplary apparatus for supplying and switching power using a 555 timer as an oscillator and an inverter and a network of bipolar junction transistors to switch current through a transformer.

In another exemplary embodiment illustrated in FIG. 9, an oscillator 150 may be coupled to the primary winding of a transformer 152 via an inverter and driver pair made up of bipolar junction transistors (BJTs) or other devices. The oscillator 150 drives the input of an inverter made up of a BJT transistor 154 and a pullup resistor 156, controlling a pair of BJT transistors 160 and 162 that alternately pull the primary winding of the transformer 152 between power 164 and ground 166.

Figure 10:
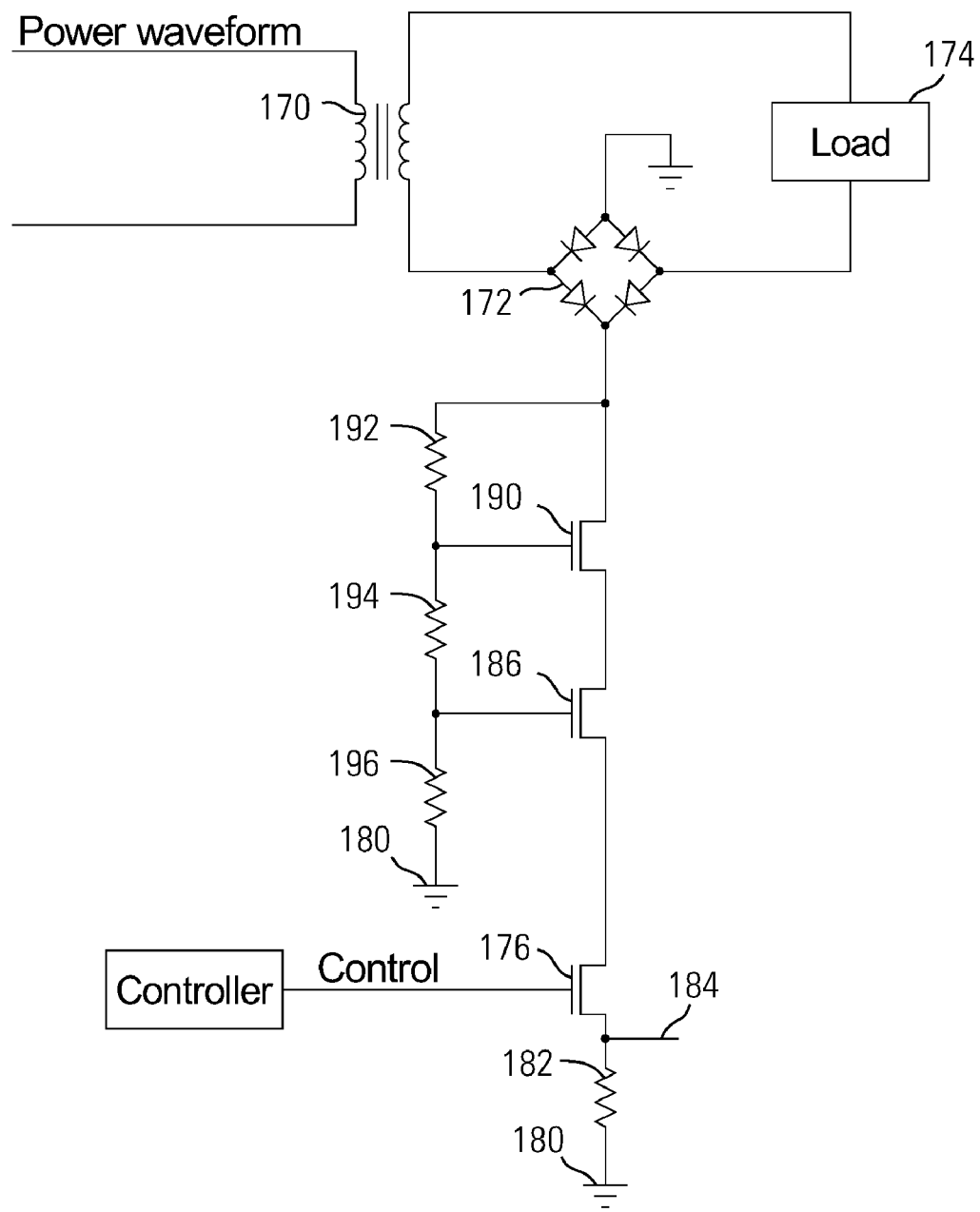
FIG. 10 is a schematic of an exemplary apparatus for supplying and switching power including stacked transistors with biasing resistors for high power applications and an optional current sensor resistor.

As mentioned above, the apparatus for supplying and switching power may be adapted to higher power and higher voltage applications by stacking transistors as illustrated in FIG. 10. A transformer 170, full bridge rectifier 172 and load 174 are arranged as described in other exemplary embodiments above or in other suitable alternative arrangements as desired. A control switch such as n-channel FET 176 is connected between the full bridge rectifier 172 and ground 180. An optional current sensor such as a resistor 182 and current sensor output 184 may be included if desired as discussed above. Additional switches such as n-channel FETS 186 and 190 may be connected in series with the control switch 176.

Figure 11:
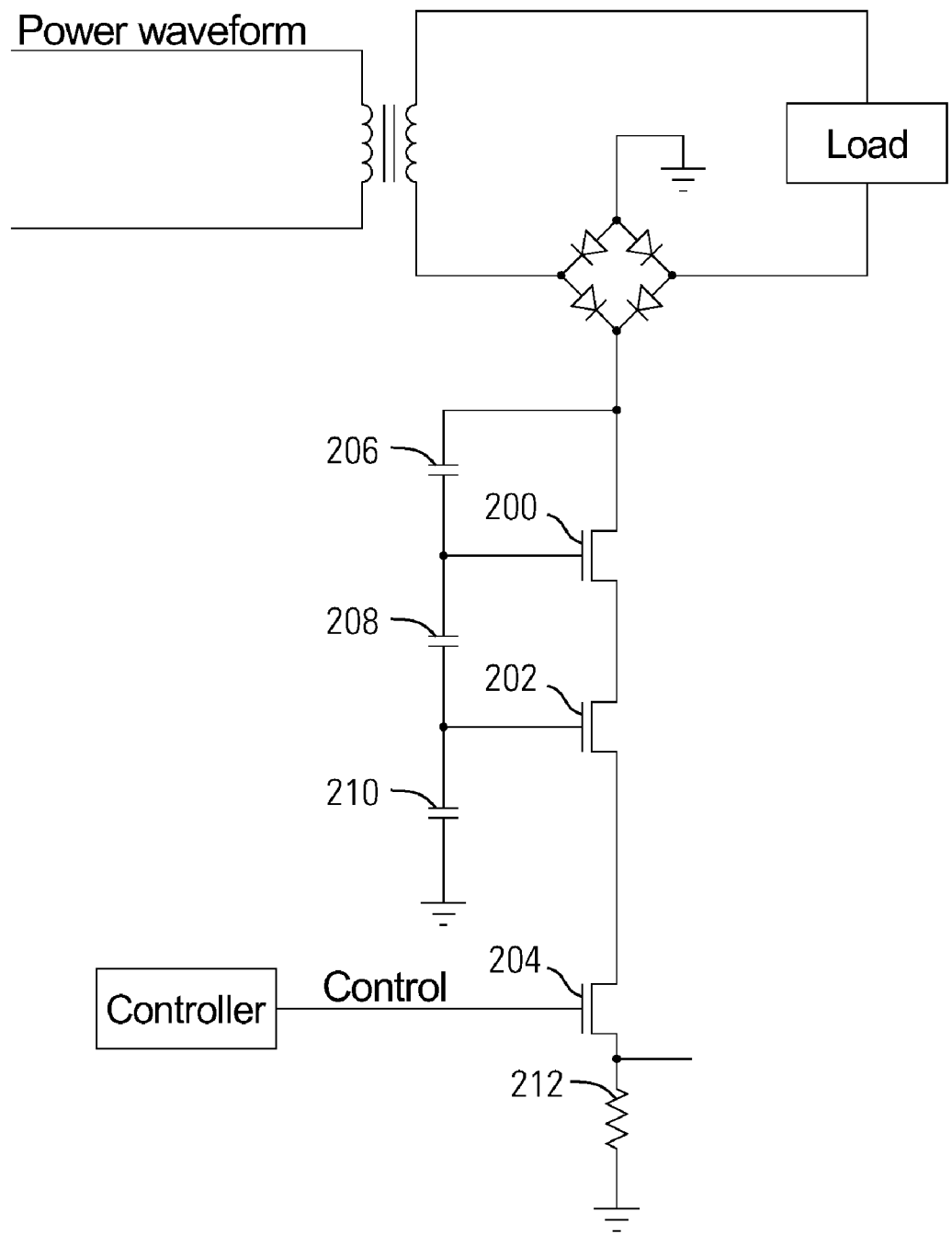
FIG. 11 is a schematic of an exemplary apparatus for supplying and switching power including stacked transistors with biasing capacitors for high power applications and an optional current sensor resistor.
Figure 12:
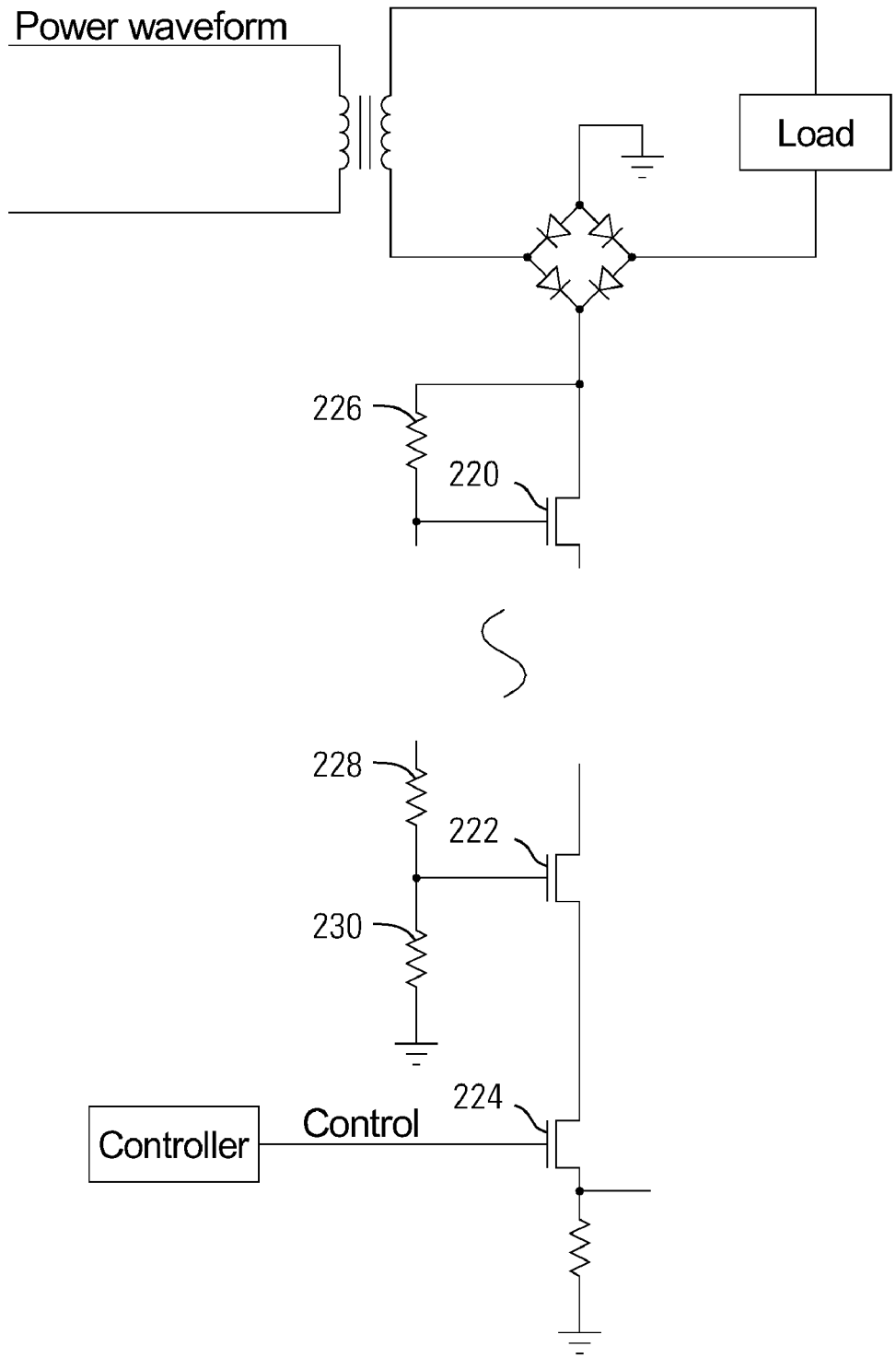
FIG. 12 is a schematic of an exemplary apparatus for supplying and switching power including additional stacked transistors with biasing resistors for high power applications and an optional current sensor resistor.

The gates of the stacked transistors 176, 186 and 190 may be biased by the nodes in a voltage divider made up of resistors 192, 194 and 196. Alternatively (see FIG. 11), in an alternating current environment, the gates of stacked transistors 200, 202 and 204 may be biased by the nodes in a voltage divider made up of capacitors 206, 208 and 210. Note again that the illustrated current sensor 212 is purely optional and may be omitted or relocated if desired. The additional stacked transistors (e.g., 176, 186 and 190) divide the voltage dropped between the full-bridge rectifier 172 and ground 180 across the transistors, enabling higher voltage operation. The apparatus for supplying power and switching may thus be used, for example, as a high voltage relay capable of handling tens of thousands of volts by dividing the voltage across multiple stacked transistors, while still enabling a low voltage control signal to turn on and off the output current and to vary the duty cycle. The transistors may be stacked as deeply as desired, as illustrated in FIG. 12. For example, a stack of 10 transistors (e.g., 220, 222 and 224) may be connected in series, each rated for 1000 volts, in order to provide a 10,000 volt output. The stack of transistors may be biased by a voltage divider chain made up of resistors (e.g., 226, 228 and 230) or capacitors as desired.

Figure 13:
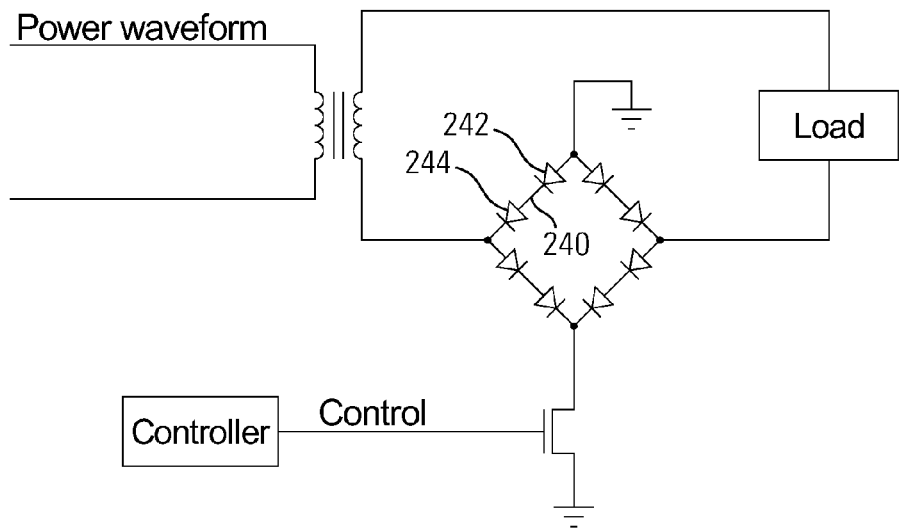
FIG. 13 is a schematic of an exemplary apparatus for supplying and switching power including stacked diodes for high power applications.

The apparatus for supplying and switching power may also be adapted to higher power and higher voltage applications by using diodes rated for high power or by stacking diodes as illustrated in FIG. 13, or by a combination of the two techniques. For example, each leg of the full bridge rectifier 240 may include two or more diodes (e.g., 242, 244). The apparatus for supplying and switching power having high power diodes and/or stacked diodes functions as with other exemplary embodiments (e.g., as in FIG. 2), although the higher potentials are safely tolerated by the high power diodes or by dividing them across multiple diodes in each leg of the full bridge rectifier 240.

Figure 14:
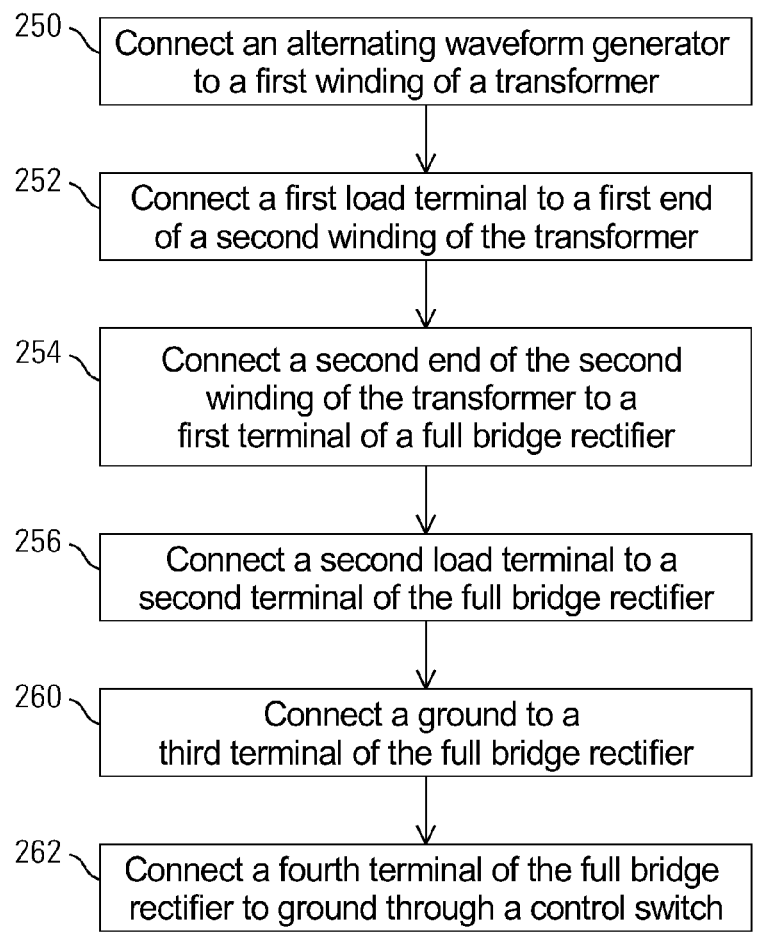
FIG. 14 is a flowchart of an exemplary operation for supplying power.
Figure 15:
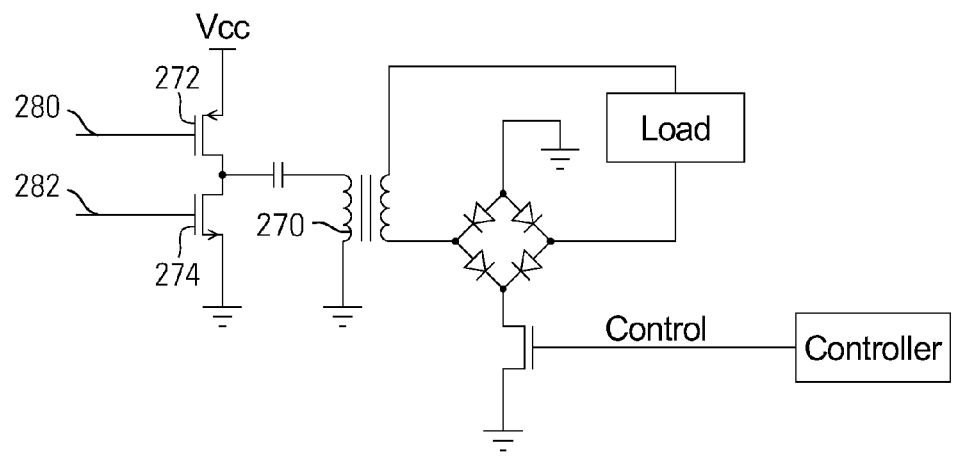
FIG. 15 is a schematic of an exemplary apparatus for supplying and switching power with a half-bridge driver on the primary transformer winding.

Referring now to FIG. 14, an exemplary operation for manufacturing a power supply will be described. An alternating waveform generator is connected 250 to a first winding of a transformer, and a first load terminal is connected 252 to a first end of a second winding of the transformer. A second end of the second winding of the transformer is connected 254 to a first terminal of a full bridge rectifier. A second load terminal is connected 256 to a second terminal of the full bridge rectifier. A ground is connected 260 to a third terminal of the full bridge rectifier, and the fourth terminal of the full bridge rectifier is connected 262 to ground through a control switch. In one exemplary embodiment, the third terminal is a diode anode-anode junction, the fourth terminal is a diode cathode-cathode junction and the first and second terminals are diode cathode-anode junctions. The exemplary operation may optionally include connecting a current sensor between the control switch and ground.

Note that any desired waveforms may be used across the primary and secondary windings of the transformer (e.g., 14) and thus across the load (e.g., 10). Similarly, any desired waveform may be used as the control signal to operate a control switch (e.g., 20), such as a pulse width modulated signal, a sine, triangle, sawtooth or square wave, or a pulse or stepped signal.

The method and apparatus for supplying and switching power described herein provides a very effective solution for providing individually controllable currents to multiple loads using a single power source and optionally one or more transformers. A sine wave or any other desired waveform may be driven in alternating directions through the loads, with the waveform shaped by supplying passive or active wave as desired in the secondary side of the circuit. Either high or low voltage load currents may be controlled using low voltage control signals, both to turn the load on and off and to vary the duty cycle of the current through the load.

Referring now to FIGS. 15-19, a number of exemplary power sources will be described for use with the method and apparatus for supplying and switching power. It is to be noted that these embodiments are purely exemplary and the method and apparatus for supplying and switching power is not limited to these embodiments. In one embodiment illustrated in FIG. 15, a half-bridge driver is used to drive one tap of the primary winding of a transformer 270, with the other tap being grounded. The half bridge driver may comprise a pull-up PFET 272 and a pull-down NFET 274, and may be controlled, for example, by a signal from an oscillator placed on the control inputs 276 and 280 of the pull-up PFET 272 and pull-down NFET 274. As is understood by those skilled in the art, the type of transistor may be adjusted as desired. For example, the pull-up PFET 272 may be replaced by a pull-up NFET, in which case the control inputs of the two transistors would be controlled by complementary signals.

Figure 16:
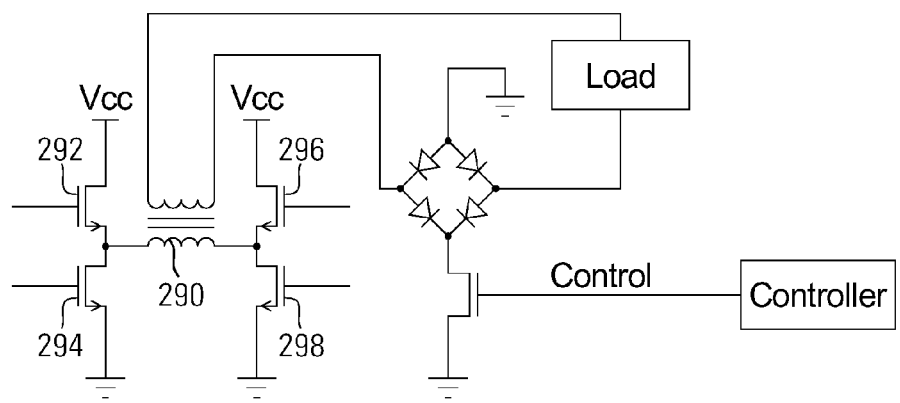
FIG. 16 is a schematic of an exemplary apparatus for supplying and switching power with a full-bridge driver on the primary transformer winding.

In another exemplary embodiment illustrated in FIG. 16, the primary winding of a transformer 290 is powered by a full-bridge driver. One tap of the primary winding is driven by a first side having a pull-up NFET 292 and a pull down NFET 294, and the other tap of the primary winding is driven by a second side having a pull-up NFET 296 and a pull-down NFET 298. The full-bridge drive may be controlled by signals from an oscillator, with complementary signals applied to the control inputs of the pull-up NFET 292 and pull down NFET 294 and an inverted version of those complementary signals applied to the control inputs of the pull-up NFET 296 and pull-down NFET 298. As is understood by those skilled in the art, the type of transistor may be adjusted as desired, with the control inputs being adapted accordingly. The transistors in this and all other embodiments described herein may comprise N or P channel metal-oxide-semiconductor field-effect transistors (MOSFETS), junction gate field-effect transistors (JFETS), insulated gate bipolar transistors (IGBTS), NPN and/or PNP bipolar junction transistors (BJTS), Darlington transistors or any other types of transistors or switches desired. Note also that the transformers may be rated for high power applications as needed or may be stacked to distribute voltage potentials across multiple components.

Figure 17:
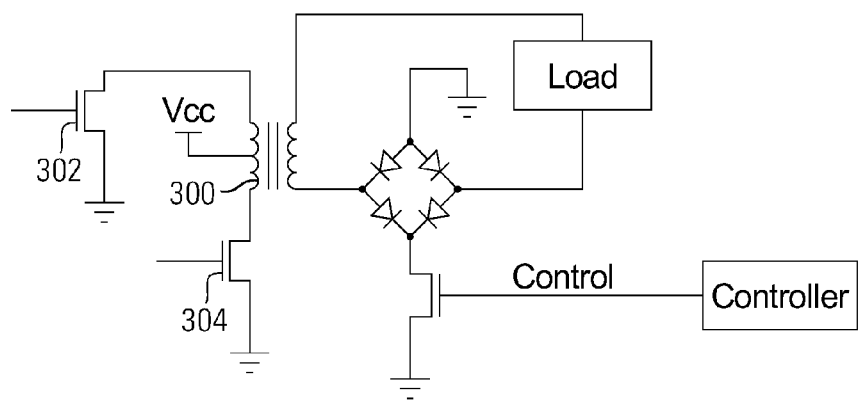
FIG. 17 is a schematic of an exemplary apparatus for supplying and switching power with a push-pull driver on the primary transformer winding.

In another exemplary embodiment illustrated in FIG. 17, the primary winding of a transformer 300 is powered by a push-pull driver. Power is supplied to the center tap of the primary winding, with the end taps alternately pulled down through NFETS 302 and 304 under the control of an oscillator. Alternatively, the center tap may be grounded with the end taps alternately pulled up through transistors 302 and 304. In yet another alternative, a three phase AC signal from a power grid or other source may be used, with one phase connected to the center tap and the other two phases connected to end taps through transistors 302 and 304. Multiple phases can be accommodated with multiple embodiments and switches as described herein. The method and apparatus for supplying and switching power is not limited to any particular type or configuration of transformer or means of driving the transformer. The transformer or alternative power supply may be run at any desired frequency, such as 50 Hertz, 60 Hertz, 400 Hertz, etc. The transformer, if used, may have a delta configuration, wye configuration, or any other desired configuration, etc.

Figure 18:
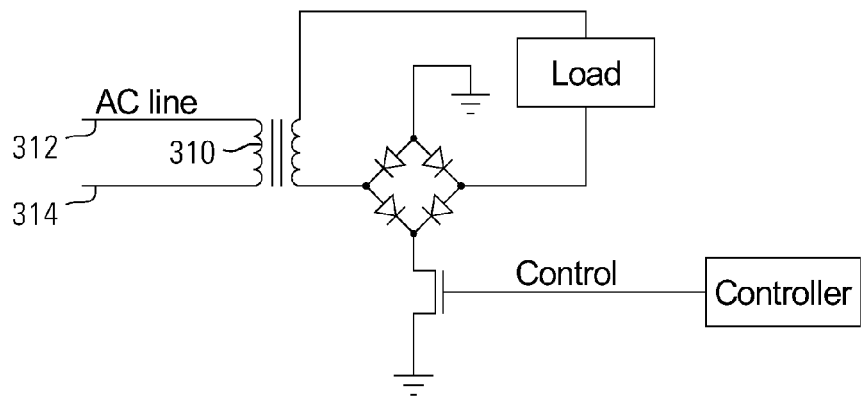
FIG. 18 is a schematic of an exemplary apparatus for supplying and switching power with an AC line voltage at the input to a transformer.

The method and apparatus for supplying and switching power described herein also may be used to switch AC power using a low voltage control signal, using a simple and effective circuit to perform a function that might otherwise be performed by solid state relays, triacs, thyristors, mosfet switches, etc. Referring now to FIG. 18, the oscillator of the previous exemplary embodiments may be replaced by connecting the primary winding of a transformer 310 to an AC signal, such as the 110 volt AC signal from a power grid. The AC signal may be connected to the transformer 310 as desired. For example, one tap of the primary winding may be connected to the hot lead 312 of an AC signal, with the other 314 being connected either to the return line of the AC signal or to a ground.

Figure 19:
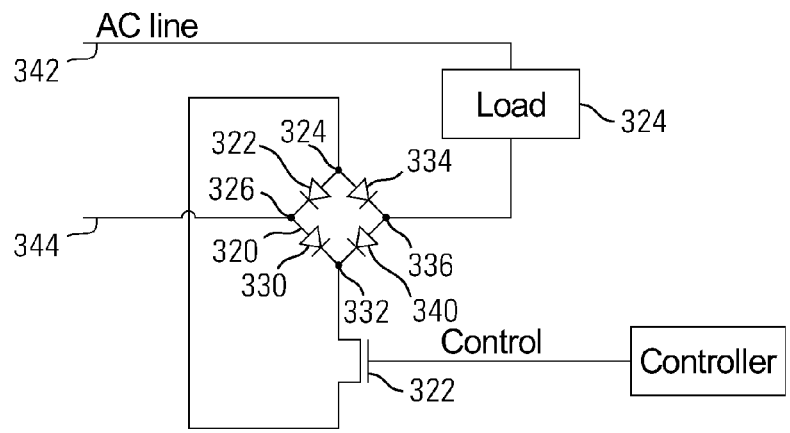
FIG. 19 is a schematic of an exemplary apparatus for supplying and switching power with an AC line voltage input.

The full bridge rectifier 320 and control switch 322 may be used to switch AC power through a load 324 without the use of a transformer if desired, as illustrated in FIG. 19. To facilitate the description of this embodiment, the full bridge rectifier will now be described. As noted above, the term "full bridge rectifier" does not imply any traditional connection at the inputs and outputs, and in fact, the full bridge rectifiers described herein have a nontraditional connection of the inputs and outputs. Also note that the diodes of this embodiment and all others may comprise high voltage diodes if desired, and may also comprise stacked diodes as in FIG. 13. A first diode 322 is connected at the anode to node 324 and at the cathode to node 326. A second diode 330 is connected at the anode to node 326 and at the cathode to node 332. A third diode 334 is connected at the anode to node 324 and at the cathode to node 336. A fourth diode 340 is connected at the anode to node 336 and at the cathode to node 332.

In this embodiment, one lead of an alternating current signal, such as the hot lead 342 of a 110 volt AC signal from a power grid, is connected to the one input of the load 324. Another lead of an alternating current signal, such as the neutral lead 344 of an alternating current signal, is connected to node 326 of the full bridge rectifier 320. A second input of the load 324 is connected to node 336 of the full bridge rectifier 320. Nodes 324 and 332 of the full bridge rectifier 320 form a reference voltage point or local ground, and are connected to each other through a control switch 322 such as a transistor. During operation, current flows through the load 324 in alternating directions as long as the control switch 322 conducts and completes the circuit. During one phase of operation, when input 342 is at a positive potential and input 344 is at a negative potential, current flows from input 342, through the load 324, diode 340, control switch 322 and diode 322 to input 344. During the other phase of operation, when input 344 is at a positive potential and input 342 is at a negative potential, current flows from input 344, through diode 330, control switch 322, diode 334 and the load 324 to input 342.

In an alternative embodiment, a current sensor may be placed anywhere desired in the circuit. For example, a resistor may be placed between the control switch 322 and node 324, with a comparator or differential amplifier connected at each end of the resistor to measure the voltage drop across the resistor, and correspondingly, the current level through the circuit.

Note that the load 324, the control switch 322 and the optional current sensor may each be placed at any desired point of the circuit through which current flows during both phases of operation, that is, in series with either input lead 342 or input lead 344 or in series with the reference voltage point between nodes 324 and 332 of the full bridge rectifier 320.

Figure 20:
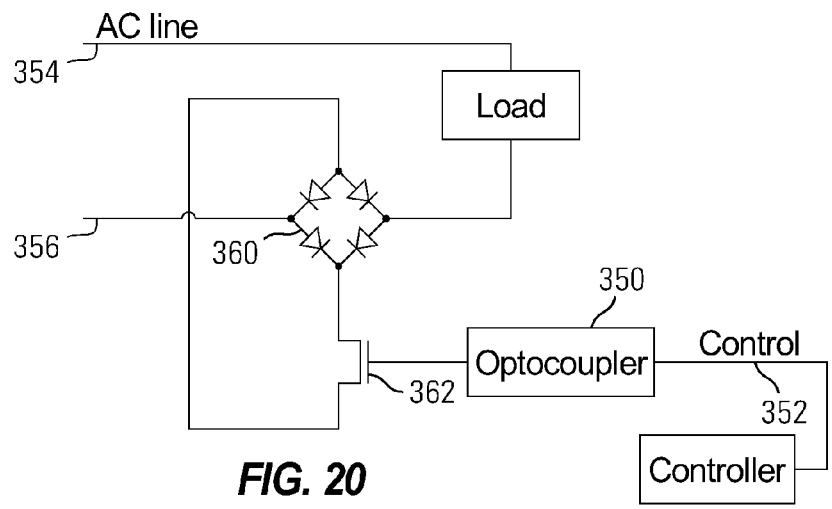
FIG. 20 is a schematic of an exemplary apparatus for supplying and switching power with an AC line voltage input, with an electrically isolated control input.

Referring now to FIG. 20, the control signal 352 and control circuitry may be electrically isolated from the power source (e.g., the AC line 354 and 356) in this or any other embodiment by inserting any suitable component such as an optocoupler 350 or optoisolator between the control circuitry and the apparatus for supplying and switching power. For example, an optocoupler 350 may be used to electrically isolate the control signal 352 from the transistor 362, thereby enabling low voltage control of the circuit while isolating the control circuitry from surges or spikes that might pass from the AC line 354 and 356, through the full bridge rectifier 360 and transistor 362. This exemplary embodiment may employ any suitable isolation means and is not limited to an optocoupler or optoisolator.

Figure 21:
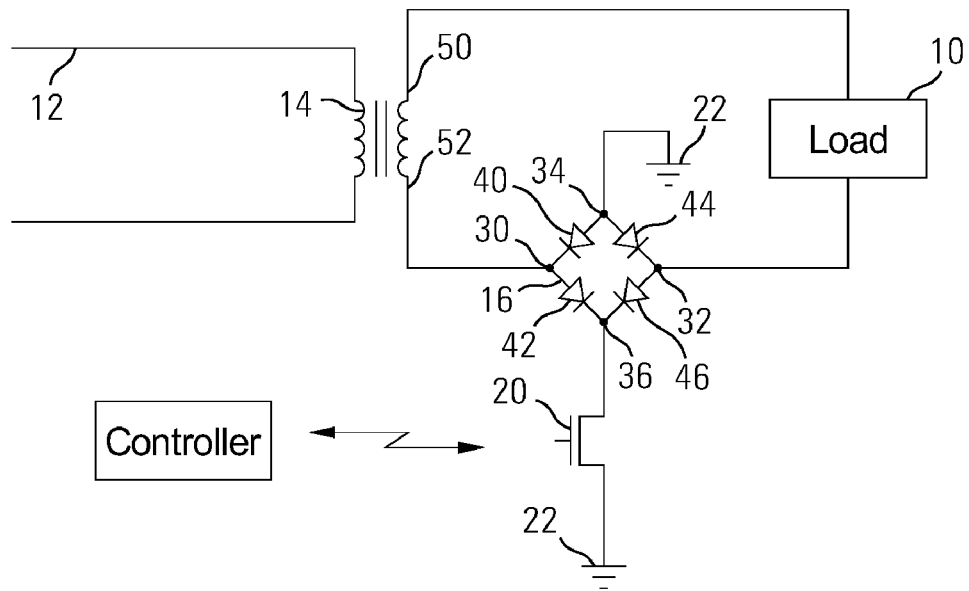
FIG. 21 is a schematic of an exemplary apparatus for supplying and switching power with a wireless connection between a controller and control switch.
Figure 22:
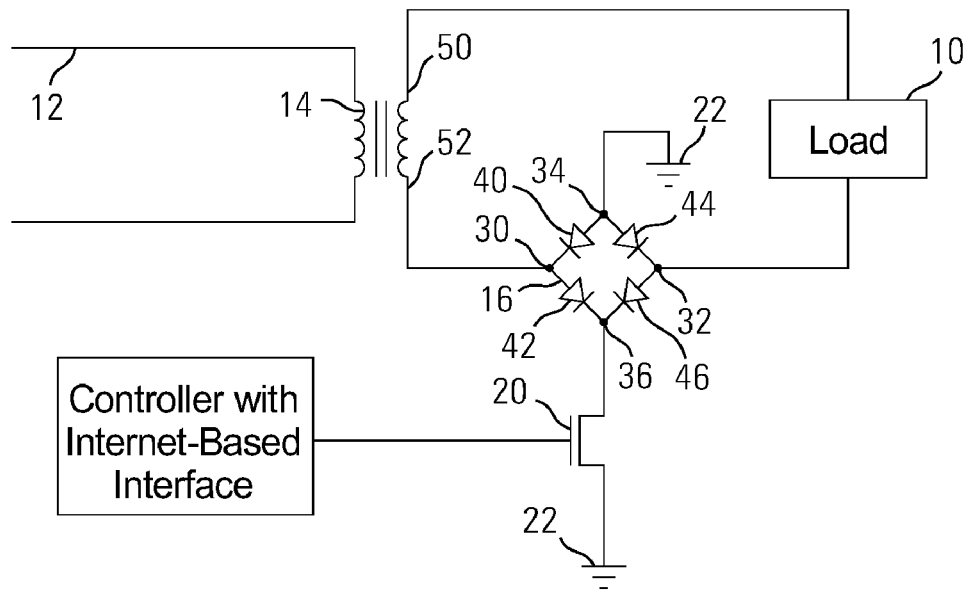
FIG. 22 is a schematic of an exemplary apparatus for supplying and switching power with a controller having an Internet-based interface.
Figure 23:
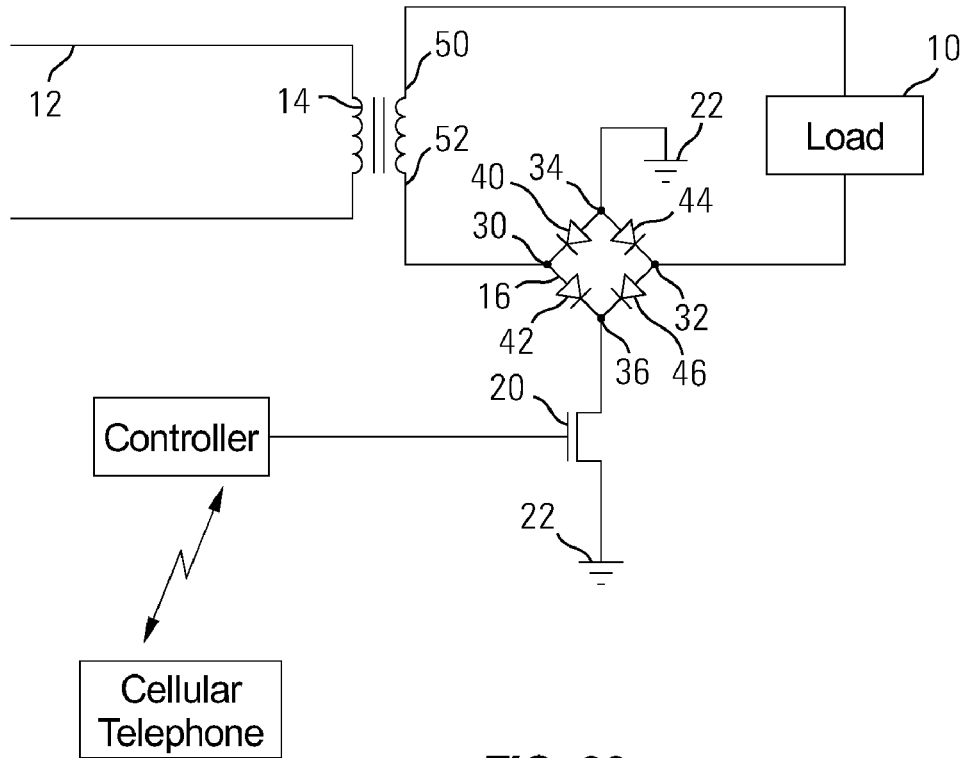
FIG. 23 is a schematic of an exemplary apparatus for supplying and switching power with a controller adapted to receive control signals from a cellular telephone.
Figure 24:
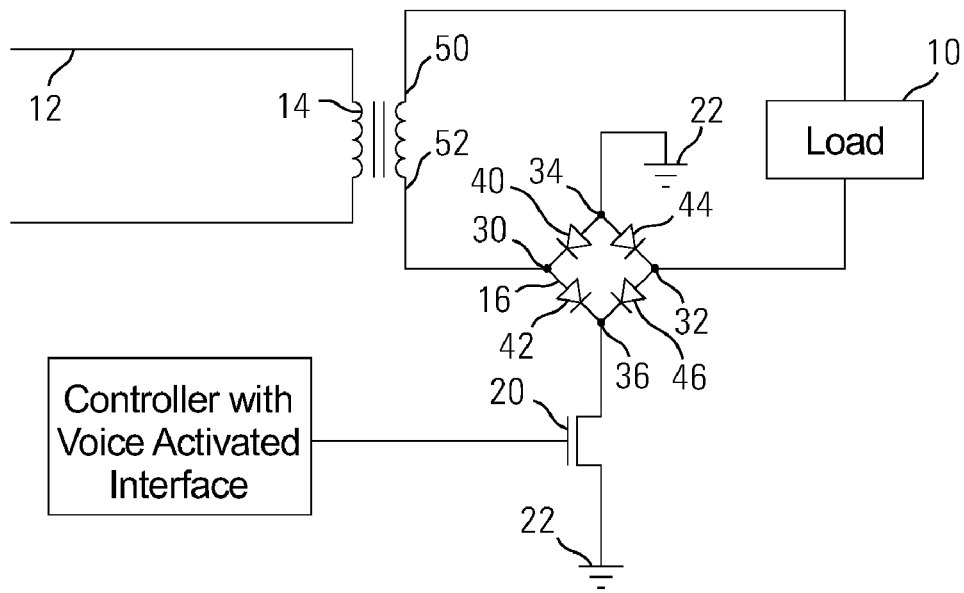
FIG. 24 is a schematic of an exemplary apparatus for supplying and switching power with a controller with a voice-activated interface.

The embodiments disclosed herein and other embodiments may be adapted for use in dimming applications, where a voltage and/or current supplied to the load is adjusted by a controller. The controller may comprise a circuit, device, program, dimming signal or other type of mechanism for controlling the switch to adjust, modify, adapt, switch, or reduce the voltage and/or current to the load. The controller is connected to the control input of the control switch or transistor at the full bridge rectifier input node, as illustrated in the drawings. The controller may use any of a number of suitable control schemes to adjust the voltage and/or current to the load, including pulse width modulation (PWM), analog, digital, phase, voltage dimming, etc. The controller may also be based on a number of suitable platforms, including one of or any combination of a microprocessor, microcontroller, FPGA, firmware, hardware, software, control, wired, wireless (see FIG. 21), Internet (see FIG. 22), web-based, cellular phone (see FIG. 23), personal digital assistant (PDA), voice control (see FIG. 24), etc.

Figure 25:
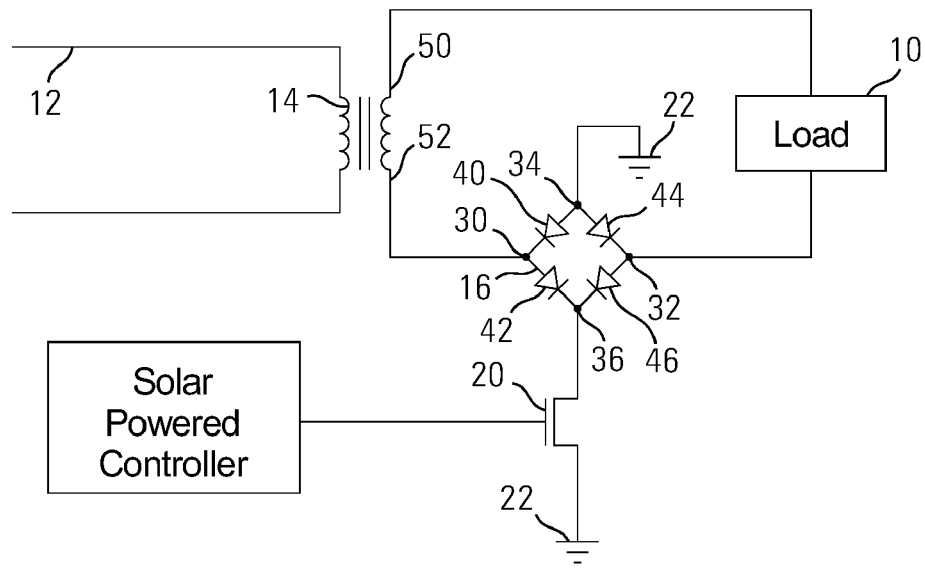
FIG. 25 is a schematic of an exemplary apparatus for supplying and switching power with a solar powered controller.
Figure 26:
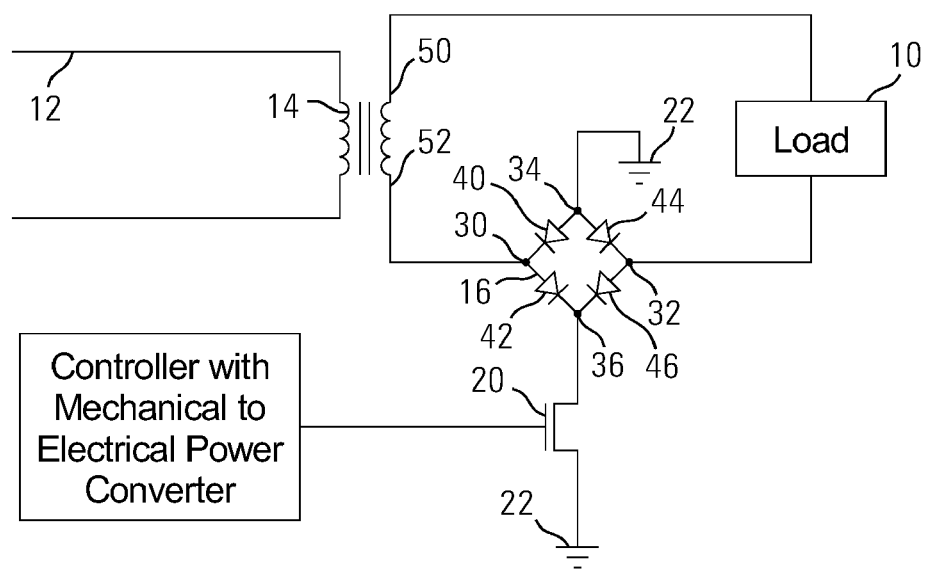
FIG. 26 is a schematic of an exemplary apparatus for supplying and switching power with a controller powered by a mechanical to electrical energy converter.
Figure 27:
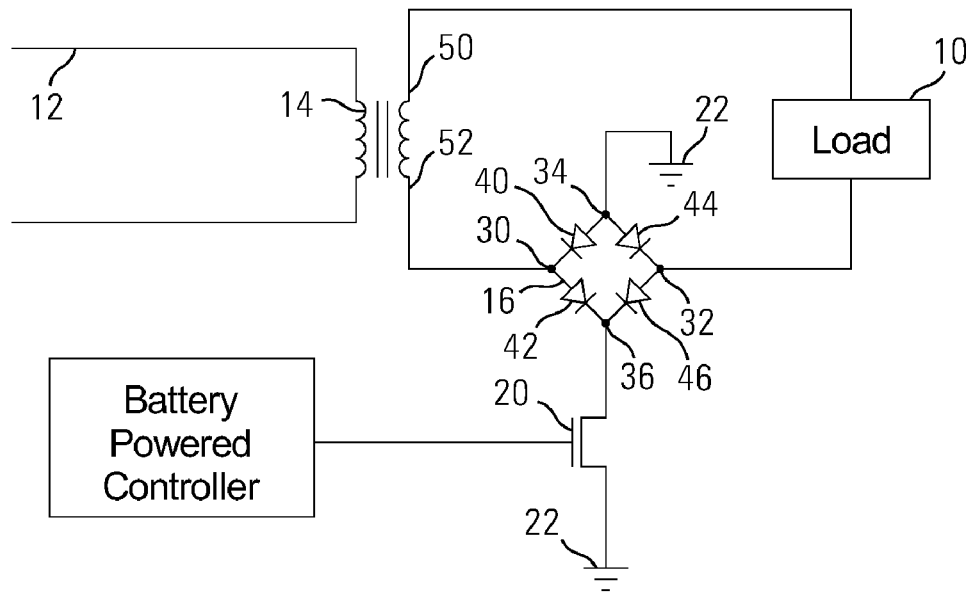
FIG. 27 is a schematic of an exemplary apparatus for supplying and switching power with a battery powered controller.
Figure 28:
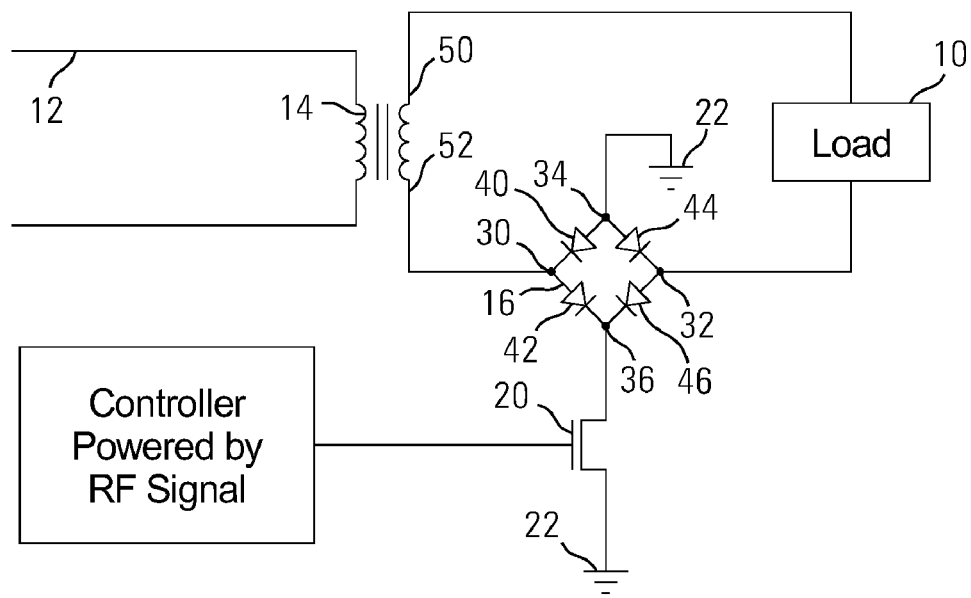
FIG. 28 is a schematic of an exemplary apparatus for supplying and switching power with a controller powered by an RF signal.

The controller may derive power directly along with the rest of the power supply disclosed herein, or may derive power from an external source, such as solar (see FIG. 25), mechanical (see FIG. 26), vibration, RF sources (see FIG. 28), or battery (see FIG. 27), etc. The controller may be connected to the control switch in either an isolated or non-isolated fashion as illustrated in the drawings, such as in the direct connection of FIG. 19 or the isolated connection of FIG. 20 via optocoupler 350. The controller may be used to dim or adjust the voltage and/or current to the load under manual control via any suitable manual interface such as dials, knobs, buttons, switches, voice commands and voice recognition, etc, or under automatic control such as by a computer or other programmed or sensory input-based stimulus. For example, the controller may be adapted to operate using a daylight harvesting control, or based on ambient light detectors and also coupled with other types of sensor such as motion sensors, RFID, microphones, etc.

A variety of loads may benefit from dimming or adjusted voltage and/or current levels. For example, light sources may be adapted to a wider range of uses by a dimming power supply. Motors and appliances may be controlled by supply voltage and/or current adjustment, either by continuous level variation such as by changing the on/off ratio or duty cycle of an input voltage and current to provide dimming and controlled brown-out capability, or by using discrete supply on/off control. For example, appliances may be turned off or operated under lower power during brown-out conditions, either under local control or under external control in a smart grid control and monitoring system. The controller may be adapted to adjust the voltage and/or current levels using any of a number of suitable control schemes, for any of a number of different types of loads for a variety of beneficial purposes.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A dimming power supply, comprising:
   a power source;
   a full bridge rectifier comprising four nodes, a first of said four nodes being connected to said power source, a second of said four nodes being connected to a load output, and a third of said four nodes being connected to a reference voltage node;
   a control switch connected between a fourth of said four nodes and said reference voltage node; and
   a controller connected to a control input of the control switch, the controller being adapted to adjust a voltage or current through the load output.

2. The dimming power supply of claim 1, wherein the controller comprises a microprocessor.

3. The dimming power supply of claim 1, wherein the controller comprises a microcontroller.

4. The dimming power supply of claim 1, wherein the controller comprises a field programmable gate array.

5. The dimming power supply of claim 1, wherein the controller comprises firmware.

6. The dimming power supply of claim 1, wherein the controller comprises software.

7. The dimming power supply of claim 1, wherein the controller is directly connected to the control input of the control switch.

8. The dimming power supply of claim 1, wherein the controller is connected to the control input of the control switch through an isolating connection.

9. The dimming power supply of claim 1, wherein the controller is connected to the control input of the control switch through a wireless connection.

10. The dimming power supply of claim 1, wherein the controller comprises an Internet-based interface.

11. The dimming power supply of claim 1, wherein the controller is adapted to receive control signals from a cellular telephone.

12. The dimming power supply of claim 1, wherein the controller is adapted to receive control signals from a voice-activated interface.

13. The dimming power supply of claim 1, wherein the controller is adapted to receive control signals from an Internet-based interface.

14. The dimming power supply of claim 1, wherein the controller is solar powered.

15. The dimming power supply of claim 1, wherein the controller is powered by a converter of mechanical to electrical energy.

16. The dimming power supply of claim 1, wherein the controller is battery powered.

17. The dimming power supply of claim 1, wherein the controller is powered via a radio frequency signal.

18. The dimming power supply of claim 1, wherein the load output comprises a lighting device outputs.

19. The dimming power supply of claim 1, wherein the load output comprises a motor power outputs.

20. The dimming power supply of claim 1, wherein the load output comprises an appliance power outputs.

* * * * *